(12) United States Patent  
Chan

(10) Patent No.: US 6,254,001 B1  
(45) Date of Patent: Jul. 3, 2001

(54) ELECTRONIC BUSINESS CARD DEVICE

(76) Inventor: George Ming Fai Chan, 1005, Fibre & Fabric Industrial Centre, 7 Shing Yip Street, Kwun Tong, Kowloon, Hong Kong (CN)

( * ) Notice: Subject to any disclaimer, the term of this patent is extended or adjusted under 35 U.S.C. 154(b) by 0 days.

(21) Appl. No.: 09/255,469

(22) Filed: Feb. 22, 1999

(51) Int. Cl.[7] .................................................. G06K 5/00
(52) U.S. Cl. ............................................. 235/380; 235/375
(58) Field of Search ...................................... 235/375, 380, 235/493, 487, 492

(56) References Cited

U.S. PATENT DOCUMENTS 5,493,105 * 2/1996 Desai ..................................... 235/375
5,604,640 * 2/1997 Zipf et al. ........................... 235/380 X

FOREIGN PATENT DOCUMENTS

WO 98/48551 * 10/1998 (WO) .

* cited by examiner

Primary Examiner—Karl D. Frech
(74) Attorney, Agent, or Firm—Jones, Day, Reavis & Pogue

(57) ABSTRACT

A method of transferring business card information from a first user to a second user includes the steps of providing said first and second users with an electronic business card device, storing data similar to that stored on a business card in a memory in each of the electronic business cards, selectively displaying at least some of the stored business card data on a visual display screen, and selectively transferring the stored business card data of at least the first user to the electronic business card of the other user for storage and selective retrieval.

9 Claims, 1 Drawing Sheet

ELECTRONIC BUSINESS CARD DEVICE

BACKGROUND OF THE INVENTION

1. Field of the Invention

The present invention relates in general to data transfer devices and in particular to an electronic business card that can receive and transmit business card data from one unit to a corresponding unit.

2. Description of Related Art Including Information Disclosed Under 37 CFR 1.97 and 1.98

The first thing that most business people do when they first meet is to exchange business cards. In most cases, the business cards collected will either be filed into a card folder or discarded. In some manner, the information on a business card that is to be retained will be kept either physically on paper or electronically by information technology such as storing the information in a personal computer. Both methods of storage are done for future retrieval and reference purposes. As each business person is likely to have printed hundreds or even thousands of name cards throughout his business life, it is clear that many of these cards end up wasted or discarded owing to the change of business, position, address, company, and the like.

Therefore, it would be prudent to have a device to serve the same information processing purpose but to save all the paper resources. Such a device can be constructed to be environmentally friendly and to be capable of saving the user time in processing the information and in physically handling the corresponding paper name card. Because electronic component cost is falling and the cost of labor is climbing, the device is an excellent alternative to the conventional paper name cards.

SUMMARY OF THE INVENTION

The present invention is an electronic device operated by batteries and is of small size with horizontal and vertical dimensions of a credit card in the plan view. The main function of the device is to store the owner's personal information, which would be the same as that printed on the owner's personal business card, and to be able to exchange the stored information with like information from others. The exchange can be accomplished through one or more ports by such means as infrared energy, radio frequencies, or direct wiring connections. The exchanged information is processed immediately by adding to the existing database and sorted. It may also be stored in the device without any processing and waits until the information is passed to a central processing unit. The owner can input his own personal card information either through a personal computer or through input keys on the electronic card. The device has a display so that the owner can read the information that is input to it and to display the information received after an exchange of information with another user device. The electronic business card (EBC) is portable and slender with very efficient data communication ability and a non-volatile data storage. For general acceptance, the thickness of the EBC can be referenced to the well known PCMCIA type II data transfer card. However, the EBC is not aimed at manual input although it can be done through appropriate keys on the card. The major input is done individually by each owner.

Through information exchanged between two of the devices, another individual's business information is inputted automatically without the use of labor. Information collected will then be processed either immediately or through a central processing unit. The processing is done automatically in a well-known manner by intelligent software either preinstalled or custom made. After the processing, the information can be retrieved, manipulated and further processed with ease. The invention is used for commercial application. It saves business people time and money and name card handling. It is not uncommon, after a big convention, that 100 name cards may be collected. It is time consuming to input and proofread the 100 name cards. If no processing is done except filing, searching for one of these name cards will be difficult. Besides carrying 100 name cards from the others and many name cards of the user is tedious and cumbersome. Therefore, the highest value of the invention is to save natural resources on paper printing and the time required for information processing. By applying the invention, commercial information will be processed efficiently after it is exchanged electronically instead of through paper printing. A complete application of the invention would further advance the commercial environment into a paperless world. As there exists real value behind the invention, users can save time and money by owning a device built according to the invention.

Thus, the device has a housing having approximately the horizontal and vertical dimensions of a credit card in the plan view. It has a thickness for providing a port that can receive a PCMCIA type II connector, well known in the art, to couple data from a personal computer to the card.

It has a data processor such as a microprocessor or a central processing unit in the housing. A data storage device in the housing is coupled to the data processor for storing data representing input information similar to that on a business card. A visual display screen displays at least some of the stored business card data selectively. At least one data transfer port is formed in the housing for transferring the stored business card data externally of the housing and for transferring business card data that is externally generated to the data storage device within the housing. As stated earlier, the data port could be an infrared port, an RF antenna, or a port for a physical (wire) connection. Data entry means on the housing enables display of selected data from the data storage device and allows the transfer of business card data to and from the data storage device through the port on the housing.

The data entry means must be very efficient since there is little room on the card for a full keyboard. With the use of software built into the electronic name card, only a few keys are required to operate the device including inputting the owner's data and exchanging data with another electronic name card.

The display will show a first level of information with several choices of characters. By pressing up and down keys, an indicator pointing at one of the displayed choices will be moved up and down respectively. The user can then select any one of the choices by pressing the select key or go to a next level of information having characters that are related with the choice by pressing another "level" key. Repeating this up, down, select, and level key pressing process, the user will be able to access to the correct character with the least number of key presses.

To achieve the least number of key presses, at least a first user operable key retrieves and displays the first level of information from the data storage device. The first level of information includes alphabet characters in groups of at least three characters and special non-alphabetic characters in groups of at least three characters.

At least a second user operable key selects a desired group of displayed characters from the first level of information and retrieves and displays a second level of information that expands a selected group of characters from the first level of information into individual characters. At least a third user operable key selects and displays the desired character from the individual characters. Once a message has been created on the display, at least a fourth user operable key stores the selected and displayed message.

The display device is preferably formed of chip-on-glass technology to provide the best resolution of the display. Further, the data storage device may include a flash memory, well known in the art, that can be programmed to recover the stored information if a default such as machine failure or transmission default occurs.

Thus, it is an object of the present invention to provide a portable electronic business card device that can be used to transfer business card information from a first user to a second user having a corresponding electronic business card.

It is another object of the present invention to store data similar to that stored on a business card in the memory means in each of the electronic business cards and a display for selectively displaying at least some of the stored business card data on a visual display screen.

Further, it is an object of the present invention to electronically transfer the stored business card data at least one user to the electronic business card of the other user for storage and selective retrieval.

Thus, the invention relates to a portable electronic business card device comprising at least first and second electronic business card devices each utilized by corresponding first and second users, a memory means in each of the electronic business cards for storing data similar to that stored on a business card, a visual display screen for selectively displaying at least some of the stored business card data, and electronic transfer means for selectively transferring the stored business card data of at least the first user to the electronic business card of the other user for storage and selective retrieval.

The invention also relates to a method of transferring business card information from a first user to a second user comprising the steps of providing said first and second users with an electronic business card device, storing data similar to that stored on a business card in a memory means in each of the electronic business cards, selectively displaying at least some of the stored business card data on a visual display screen, and selectively transferring the stored business card data of at least the first user to the electronic business card of the other user for storage and selective retrieval.

BRIEF DESCRIPTION OF THE DRAWINGS

These and other objects of the present invention will be more fully disclosed when taken in conjunction with the following Detailed Description of the Preferred Embodiment(s) in which like numerals represent like elements and in which.

DETAILED DESCRIPTION OF THE PREFERRED EMBODIMENT(S)

Figure 1:
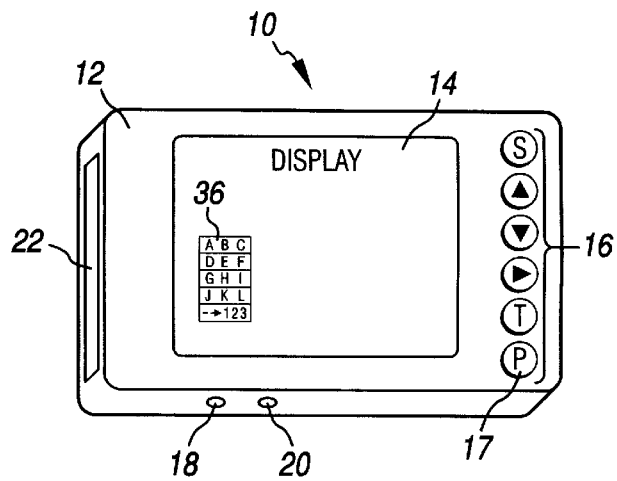
FIG. 1 is a perspective view of a novel electronic business card.

FIG. 1 is a perspective view of the novel electronic business card of the present invention. The electronic business card 10 can be seen to have a housing 12 that is about the size of a common business card in length and width. A standard business card has a length of approximately 3⅜ inches or 86 mm. and a width of approximately 2⅛ inches or approximately 54 mm. The maximum length desired or preferred is 90 mm. or 3.54 inches and the preferred maximum width is 55 mm. or 2.2 inches. The preferred thickness is that sufficient to allow a type II PCMCIA connector to be inserted in slot 22 to make connection to a personal computer if desired. Thus, so that the electronic business card 10 can receive the PCMCIA type II connector through connecting port 22, the preferred thickness of the electronic business card 10 should not exceed 5 mm. or 0.2 of an inch. The housing 12 has a display 14, data manipulating keys 16, an infrared receiving port 18 and an infrared transmitting port 20. It will be understood that ports 18 and 20 may represent an antenna for RF transfer of the data or has at least one terminal jack for physical wire transfer of the data from one electronic data card into another.

Figure 2:
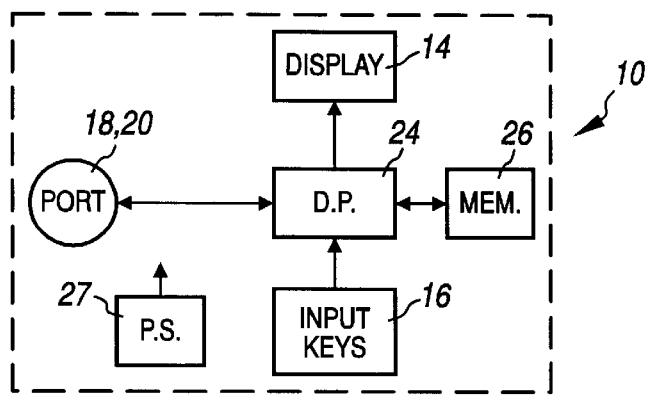
FIG. 2 is a schematic diagram of the electronics in said electronic business card of FIG. 1.

The internal circuitry of the business card 10 is shown in block form in FIG. 2. A data processor 24 is coupled to a memory 26, which is preferred to be a flash memory, well known in the art, because such memory minimizes the risk of information loss in the case of battery or power failure. Under such default conditions, the flash memory is programmed, in a well-known manner, to recover the stored information if a default such as machine failure or transmission default occurs. A display 14 is also coupled to the data processor 24 as well as the input key 16 shown in FIG. 1. A power supply 27, such as a rechargeable battery, may be used to power the card. The data processor also sends information to and receives information from the infrared ports 18 and 20 which, as stated earlier, could be an antenna for RF transmission or a physical connection for wire transfer of data, respectively.

Because a paper name card has a great deal of printed information thereon and that to maintain as much of such information in the electronic business card that can be seen at once as possible, the display must have a high enough resolution without giving up the basic requirements of the approximate size of a corresponding credit card. Thus, as both display size and machine size are important, chip-on-glass (COG) technology is preferably utilized. Such technology again is old and well known in the art.

Figure 3:
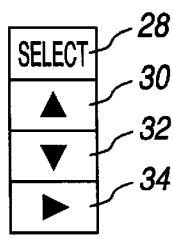
FIG. 3 is an enlarged version of a portion of the keys on the electronic display card for manipulating the data stored therein.

FIG. 3 illustrates the first four keys of the group of keys 16 shown in FIG. 1. The first or top key 28 is used to select the indicated choice of data that appears on the display screen when the power is applied to the display by activating input key 17 shown in FIG. 1.

A second scroll-up key 30 allows the user to scroll up from one choice to the next choice from the bottom of the displayed data and to delete the first choice on the top of the bar. A third scroll-down key 32 allows the last choice at the bottom of the bar to be deleted and a new choice added to the top of the bar. Finally, a fourth, right arrow key 34 chooses and displays the indicated choice and enters the next level of information.

Figure 4:
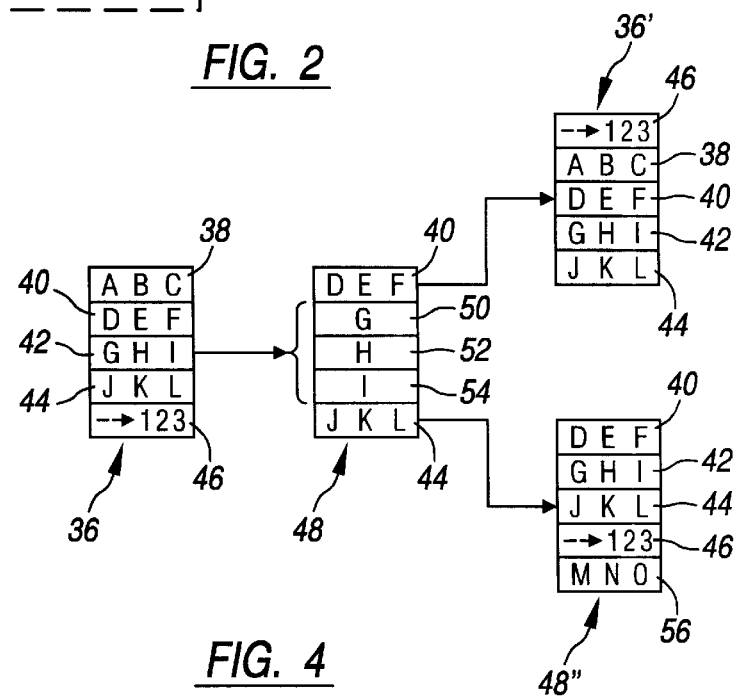
FIG. 4 is a schematic diagram illustrating the relationship of first and second levels of information that can be retrieved under the direction of a program in order to be able to use only a few instruction and data input keys to allow efficient input of any characters into the device using a very limited number of keys.

In order to allow efficient input of any characters into the device, a special processing arrangement is utilized as illustrated in FIG. 4. The first level of information 36 is shown on the display in FIG. 1 and is also illustrated in FIG. 4. It has five vertical blocks 38, 40, 42, 44, and 46 that have alphabetic and non-alphabetic characters thereon. By using the up and down keys 30 and 32, the indicator 37 (shown in FIG. 1) will move up and down to the basic choices on the screen in the first level of information.

Referring now to FIG. 4, if the indicator or cursor 37 is moved to select block 42, the letters "GHI", and "right" arrow key 34 is activated, the second level of information 48 is generated which has blocks 40 and 44 separated by individual letters G, H, and I, in blocks 50, 52, and 54, respectively. Then by scrolling the cursor 37 with respect to the vertical blocks to select the desired letter and then pressing the select button 28, that letter will be displayed. If, while in the second level of information 48, it is desired to return to the first level, either block 40 or block 48 can be selected with cursor 37 and the results obtained are illustrated in blocks 36' and 36".

Thus, it can be seen that the alphabet or non-alphanumeric characters can be perused quickly to form a message on the display 14. Thus, by having the first level of information give only a few choices, such as five as shown, a large display area is not required. The indicator of choice or cursor may be fixed at one location and the choices can be scrolled up or down to provide a choice for selection.

Thus, the right arrow key 34 selects the indicated choice and enters the next level of information as necessary.

Thus, there has been disclosed a novel electronic business card that stores the owner's personal information and that can exchange the stored information with the electronic business card of another card owner storing personal information by methods such as infrared, radio frequency, and/or direct wiring. The device is slim with very efficient data communication ability on a non-volatile data storage. For general acceptance, the thickness of the device can be referenced to the well known PCMCIA type II connector card. The major input is done individually by each owner and through information exchange between two devices, other persons' information is inputted automatically without use of labor. Information collected can then be processed through a central processing unit. The processing is done automatically by intelligent software preinstalled and well known in the art. After the processing, the information can be retrieved, manipulated, and further processed with ease.

The corresponding structures, materials, acts, and equivalents of all means or step plus function elements in the claims below are intended to include any structure, material, or act for performing the function in combination with other claimed elements as specifically claimed.

What is claimed is:

1. A method of transferring business card information from a first user to a second user comprising the steps of:

providing said first and second users with an electronic business card;

storing data similar to that stored on a business card in a memory means in each of said electronic business cards;

selectively displaying at least some of the stored business card data on a visual display screen; and selectively transferring the stored business card data of at least the first user to the electronic business card of the other user for storage and selective retrieval;

wherein the step of selectively displaying at least some of the stored business card data on said display screen further comprises the steps of:

retrieving and displaying a first level of information from said storage device including alphabet characters in groups of at least three characters and special non-alphabetic characters in groups of at least three characters;

selecting a desired group of displayed characters from said first level of information;

selecting and displaying a second level of information that expands the selected group of characters from said first level of information into individual characters; and selecting and displaying desired characters from said individual characters to form a displayed message.

2. The method of claim 1 further comprising the step of transferring said data from one electronic business card to another by infrared means.

3. The method of claim 2 further comprising the step of transferring said data from one electronic business card to another by radio frequencies.

4. The method of claim 1 further comprising the step of transferring said data from one electronic business card to another by a connection device physically connecting the two electronic business cards together.

5. The method of claim 4 further comprising the step of forming said electronic business card of a thickness sufficient to receive a type II PCMCIA connector for receiving data from and transmitting data to a personal computer.

6. The method of claim 1 further comprising the step of storing said displayed message.

7. The method of claim 1 further comprising the step of forming said display device of chip-on-glass technology to provide sufficient resolution of said display.

8. The method of claim 1 further comprising the step of forming said data storage device from a flash memory.

9. The method of claim 8 further comprising the step of programming said flash memory to recover the stored information in the event of a default such as machine failure or transmission default.

\* \* \* \* \*